United States Patent Office 3,706,590
Patented Dec. 19, 1972

3,706,590
FUNCTIONAL SURFACE COATING COMPOSITIONS FOR CELLULOSIC MATERIAL
Ronald C. Moyer, North Kingstown, R.I., and Melville W. Uffner, Media, Pa., assignors to Air Products and Chemicals, Inc., Allentown, Pa.
No Drawing. Original application Dec. 15, 1969, Ser. No. 885,314, now Patent No. 3,664,987, dated May 23, 1972. Divided and this application Jan. 31, 1972, Ser. No. 222,360
Int. Cl. B44d 1/02
U.S. Cl. 117—111 B                 8 Claims

ABSTRACT OF THE DISCLOSURE

Functional surface coating compositions, prepared by blending a mixture of a fluorine-containing phosphate material and a non-fluorine-containing material in aqueous medium, impart solvent, grease and oil resistance to cellulosic materials.

CROSS REFERENCE TO RELATED APPLICATIONS

This application is a divisional of application, Ser. No. 885,314, filed Dec. 15, 1969, now Pat. No. 3,664,987, patented May 23, 1972.

BACKGROUND OF THE INVENTION

The present invention relates to the treatment of cellulosic material with a functional surface coating composition to render the cellulosic material solvent, oil and grease resistant. More particularly, the present invention relates to the use of a functional surface coating composition, prepared by blending a fluorine-containing phosphate material with a non-fluorine-containing material in an aqueous medium, for imparting solvent, oil and grease repellency to cellulosic materials such as paper and paperboard.

Natural and synthetic polymers, especially those which are water soluble or water dispersible, are widely used in functional surface coatings to improve the substrate's appearance, printability and oleophobicity. Natural polymers include: starches, casein, modified cellulose, and soya protein. Synthetic polymers include: polyethylene, urea- and melamine-formaldehyde, polyacrylamides, polyvinyl acetate, ethylene-vinyl acetate, polyvinyl alcohols, polyvinyl chloride, acrylics, styrene-butadiene, acrylic-butadiene, styrene-maleic anhydride, and polyvinylidene chloride. These natural and synthetic polymers are called converting chemicals. When they are applied to form paper on the paper machines, they are "on-machine" coatings. When they are applied on a separate machine (for example in a converter's plant), they are "off-machine" coatings.

Only a few of the aforementioned converting chemicals provide resistance to oils, grease and solvents; for example: polyvinyl alcohol, polyvinylidene chloride, and casein. Polyvinyl alcohol is expensive; polyvinylidene chloride because of its crystallinity tends to fracture readily; and casein is subject to shortages in supply and price fluctuation. So wherever possible, converters prefer to avoid the use of these chemicals.

Other converting chemicals such as latexes resulting from emulsion copolymerization of alkenyl aromatic monomers, such as styrene, and diolefins, such as butadiene, have been used for coating cellulosic materials, but these converting chemicals are not solvent resistant and are not grease resistant. Moreover, such converting chemicals do not yield a continuous pin hole free surface when applied to cellulosic materials.

Fluorochemicals, in themselves, have been used to treat paper for improved oil, grease, and solvent repellency. Such treatment is expensive because of the high cost of the fluorochemicals. Moreover, in many instances the fluorochemical coatings do not meet the requirement for a continuous surface coating. In the past fluorochemicals have been added in small amounts to polyvinyl alcohol and to carboxymethyl cellulose to upgrade or increase the solvent, grease and oil repellency of these polymers but little or no success has been obtained with the addition of commercially available fluorochemicals to low cost, converting chemicals such as styrene-butadiene, starch, and vinyl acetate homopolymers and copolymers, or to higher priced converting chemicals such as polyvinylidene chloride.

It has now been discovered that certain converting chemicals can be modified by the addition of minute amounts of fluorine-containing phosphate materials to produce functional surface coating compositions which provide outstanding solvent, oil and grease barrier characteristics when applied to cellulosic materials, such as paper and paperboard. Further, such functional surface coating compositions provide grease, solvent, and oil resistance to creased paper and to scored paperboard—resistance either not provided with previously existent fluorochemicals or not provided with previously existent fluorochemicals at an economical cost.

SUMMARY OF THE INVENTION

It is an object of the present invention to render cellulosic materials solvent, grease and oil repellent.

Another object of this invention is to provide functional surface coating compositions for treating cellulosic material.

Still another object of this invention is to provide a process for imparting solvent, oil and grease resistance to cellulosic materials by treating said materials with functional surface coating compositions prepared by blending a fluorine-containing phosphate material and a non-fluorine containing material in an aqueous medium.

In accordance with the present invention, functional surface coating compositions are prepared by mixing 0.05 to 10 percent by weight of an active fluorine-containing phosphate material with 90 to 99.95 percent by weight of a non-fluorine containing material and the resulting compositions are used to impart solvent, grease and oil resistance to cellulosic materials such as paper, cardboard, paperboard, etc. The non-fluorine containing material employed in the present invention is carboxylated styrene-butadiene, hydroxyethylated starch, polyvinylidene chloride, or a vinyl acetate copolymer.

Monomers which can be copolymerized with vinyl acetate to form the vinyl acetate copolymers include such monomers as ethylene, propylene, vinyl chloride, maleic acid, itaconic acid, dibutyl maleate, etc.

The active fluorine-containing phosphate materials which can be used in the present invention have the formula $(R_fL)_{3-y}Z$ [Formula I] where:

$R_f$ is: $R_2(CF_2)_a-$, where $R_2$ is F or H and $a$ is an integer between 1 and 20; $(CF_3)_2CR_3(CF_2)_b-$, where $R_3$ is F or H and $b$ is 0 and $R_3$ is F when $b$ is an integer between 1 and 18; or $R_4(c-C_6F_{10})-$, where $R_4$ is F or $C_nF_{2n+1}$ and $n$ is an integer between 1 and 4 where c- designates an alicyclic structure;

L is:

$$-SO_2\underset{\underset{R_5}{|}}{N}-(CH_2)_2O-$$

where $R_5$ is an alkyl group having 1 to 10 carbon atoms; or $-(CH_2)_nO-$, where $n$ is the integer 1 or 2;

$y$ is an integer of 1 or 2; and

Z is: —$P(O)(OM)_x$ where $x$ is the integer 1 or 2; and M is a water-solubilizing cation of the group consisting of alkali metal, ammonium and substituted ammonium where $x$ is 1, and each M is independently selected from the group consisting of hydrogen, alkali metal, ammonium and substituted ammonium when $x$ is 2.

The linear fluorine-containing phosphate materials of the above description are compounds known in the art and are also well-documented in the literature. For example, alkali metal, ammonium and substituted ammonium salts of polyfluoroalkyl phosphates are taught in U.S. Pats. 2,559,749; 3,083,224 and 3,112,241. Perfluoroalkyl-sulfonamidoalkyl phosphate materials are disclosed in U.S. 3,094,547. Furthermore, the foregoing phosphate compounds of the instant invention having alicyclic structures, such as the bis-(1,1-dihydroperfluorocyclohexylmethyl) phosphates and methods of manufacture are taught in co-pending application, Ser. No. 39,175, filed May 20, 1970, which is a continuation-in-part of application, Ser. No. 844,197, filed July 23, 1969, now abandoned. Such applications and their teachings are incorporated-by-reference herein.

After being applied to the desired cellulosic substrate, the functional surface coating compositions used in the present invention are dried at a temperature from 23° C. to 205° C. for between 24 hours and 5 seconds. It has been discovered that the presence of as low as 0.05% active fluorochemical in the functional surface coating composition provides an effective oil, solvent, and grease resistant barrier and that it is generally not necessary to use more than 10% active fluorochemical. Nevertheless, higher and lower percentages of fluorochemical can be employed—the upper limit being determined largely by economic considerations and the degree of solvent, oil and grease resistance required.

DESCRIPTION OF THE PREFERRED EMBODIMENTS

As indicated above, the functional surface coating compositions of the present invention are prepared by mixing between 0.05 and 10 percent by weight of an active fluorine-containing phosphate material having the structure defined by Formula I with between 90 and 99.95 percent by weight of the non-fluorine containing material.

The following materials are representative of materials which have a structure corresponding to Formula I:

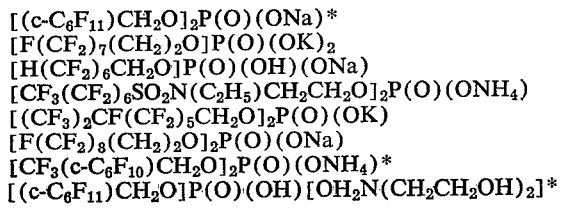

*c- designates an alicyclic structure.

The alkali metal of the water-solubilizing cation M in Formula I is either sodium or potassium. The substituted ammonium salts may be obtained using the commonly available, water-soluble, primary, secondary or tertiary amines, such as methyl amine, diethyl amine, monoethanol amine, diethanol amine, morpholine, triethanol amine and bis-(3-hydroxypropyl) amine.

The non-fluorine containing material which is mixed with the fluorine-containing phosphate material in order to obtain the functional surface coating compositions of the present invention consists of carboxylated styrene-butadiene, hydroxyethylated starch, polyvinylidene chloride or vinyl acetate copolymer.

For various coating applications, it is desirable to have certain additives incorporated with the functional surface coating compositions. Typical examples of such additives commonly used in the art of paper coating are colors, organic and inorganic pigments, stabilizers, fillers, defoamers and natural binders. These additives are intermixed with the functional surface coating compositions of this invention by conventional blending methods. Thus, the additive may be finely comminuted and stirred into the functional surface coating compositions or an aqueous emulsion of the additive may be blended with the functional surface coating compositions.

For coating paper it is frequently desirable to incorporate a minor amount of natural binders such as casein and starch to achieve certain coating properties. Such natural binders may constitute from about 10 to 25 percent by weight of the combined material.

The functional surface coating compositions are well adapted for application to paper and other similar materials. These compositions can be applied by any one of several means, e.g., roller, brush, size press, air knife or other known coating methods. The resultant thin coatings are adequate for most applications. If slightly thicker coatings are desired, the functional surface coating compositions may be thickened with a small amount of a hydrophobic colloid, such as the cellulose ethers.

The functional surface coating compositions of this invention are air dryable to a useful continuous coating. It should be understood, however, that the functional surface coating compositions of the present invention may be baked if desired. Baking reduces the drying time significantly and results in a coating which is at least as effective as air dried coatings.

The coated papers resulting from the application of these functional surface coating compositions exhibit excellent solvent resistance. Although the coatings may change from clear to opaque when wet, there is no loss of protection. The coatings are clear in unmodified state and may be colored with pigments or dyes. The coatings exhibit good adhesion to paper and to solid additives. They also have a high gloss and may be printed in a conventional manner.

The functional surface coating compositions are especially advantageous because of the following characteristics:
(1) Solvent holdout of dopes applied to electrostatic and carbon papers, thereby preventing strike-in of the dope.
(2) "Fugitive" holdout (short term holdout; seconds or a fraction of a second) of solvent and oil-based printing inks.
(3) Wax holdout (keeps wax on surface).
(4 Asphalt holdout (previous bleeding on shrouding papers and tapes).

The following method is employed for applying and testing the functional surface coating compositions of the present invention. The fluorochemical, in aqueous medium, is added to the non-fluorine containing material, which is in the form of a solution or dispersion (latex), under propeller blade agitation. A clay slurry, defoamer, color, or other ingredient may be added at any stage of the addition. The pH of the system may be adjusted to from 4 to 11 without loss of the inherent properties of the fluorochemical. Ammonium hydroxide is the preferred neutralizing agent. Optimum pH adjustment is governed by the stability range of the latex and regard to protecting the paper from "tenderizing."

For test purposes, the functional surface coating composition is coated on paper or paperboard by means of a wire wound rod, commonly employed in paper coating laboratories. The coated paper is dried for 10 minutes at 83° C. in a circulating forced draft oven, and stored for 72 hours at 23° C. and 50% relative humidity prior to testing.

Coating weights are determined by the difference in weight between the dry uncoated paper (of known surface area) and the dried coated paper. Coating weights are adjusted to read in pounds per ream; a ream of paper being 3,000 square feet and a ream of paperboard being 1,000 square feet.

The following test kit, comprising a series of alkanes ranging in surface tension from 20 to 31 dynes/cm., is used to determine solvent resistance. The series and the "coalescence" test ratings applicable to each alkane are shown below:

| | Coalescence value |
|---|---|
| Nujol | 31 |
| 75/25 Nujol/n-hexadecane | 30 |
| 50/50 Nujol/n-hexadecane | 29 |
| n-Tetradecane | 27 |
| n-Dodecane | 25 |
| n-Decane | 24 |
| n-Octane | 22 |
| n-Heptane | 20 |

The coalescence value is in indirect measure of the wetting and spreading which the test liquid makes with the sized surface. Two drops of each liquid in the test kit are placed on 3/8" centers on the sized surface. These drops bead on a solvent resistant surface. The surface tension of that liquid of lowest surface tension, two drops of which will not spread and coalesce within one minute, determines the rating. The lower the number the higher the solvent resistance.

An accelerated comparison of the relative rates at which oils or greases, such as commonly found in foodstuffs, may be expected to penetrate papers such as uncoated or unimpregnated grease-proof, glassine and vegetable parchment (TAPPI T507su-68 test) is obtained by using apparatus which includes:

(1) A tube of any rigid material, 2.5 cm. (1 in.) inside diameter (ID) and at least 2.5 cm. (1 in.) in height, the ends of which have been smoothed.

(2) A pipet or medicine dropper, calibrated to deliver 1.1 ml.

(3) Round-grained sand, Ottawa cement testing sand screened to pass a No. 20 and be retained on a No. 30 sieve.

(4) Sheets of white coated and calendered book paper 104 g./m.$^2$, 70 lbs. at least the same size as the test specimen, preferably much larger.

(5) A stopwatch or laboratory timer.

Reagents, i.e., peanut oil, Nujol, liquid lard, and corn oil, are separately placed in bottles (100 ml. in each bottle) with 1.0 gram of an oil soluble red dye. Each specimen is then placed on a sheet of the book paper resting on a smooth flat surface. An end of the tube is placed on the specimen and 5 grams of sand are placed in the tube. The purpose of the tube is solely to ensure a uniform area of the sand pile and the tube is removed immediately after the addition of the sand. Using the pipet or medicine dropper, 1.1 ml. of the colored oil or grease is added to the sand, and the timing device is started. Three conditions of folds exist for the specimen, namely:

(A) No fold
(B) Creased into
(C) Creased away.

The test proceeds for 72 hours at 60° C. or until the stain strikes through the treated paper and stains the book paper beneath it.

Similar apparatus is employed in making turpentine test T454ts-66 for grease resistance of paper. The reagent (100 ml. of pure gum spirits turpentine having a specific gravity of 0.680 to 0.875 at 16° C.) is placed in a container with 5 grams of anhydrous calcium chloride and 1.0 gram of an oil-soluble red dye. The container is then closed and shaken well periodically over a period of at least 10 hours. The reagent is then filtered through a dry filter paper at a temperature of approximately 21° C. and stored in an air-tight bottle. The method of turpentine application and timing for stains is identical to that for the other reagents mentioned above.

The TAPPI RC-19 test shows the rate of printing-ink varnish absorption at the surface of paper or paperboard. The test ink is made from a non-drying varnish, such as is used in most black inks. Unlike ordinary printing ink, an oil-soluble dye has been dissolved in the varnish. The ink is standardized not just to produce a uniform gray color, but to give the correct stain when absorbed in the paperboard or paper.

The apparatus consists of the standard ink in a tube or can, a small spatula, stopwatch and a clean soft cloth. The test specimen is a flat uncreased sample of any convenient size.

The surfaces to be tested are placed uppermost, so that the edges overlap each other 1 or 2 inches. The test ink is mixed a little with a spatula and then smeared about 1 inch wide over the overlapping samples while starting the stopwatch. The amount of ink smeared on the sample is not important as long as the film remains glossy on the top. If the film becomes dull, the test is repeated, using more ink. After exactly 2 minutes, most of the ink is removed with the spatula and the remainder is wiped away with a clean soft cloth. The varnish which has penetrated the paperboard or paper will be shown by a blue stain of varying depth. Deep discoloration or stain indicates high rate of varnish absorption, while light discoloration indicates low absorption or good gloss-ink properties. Such results are reported as deep, medium, and light discoloration or stain.

The invention will be illustrated by the following specific examples, it being understood that there is no intention to be necessarily limited by any details thereof since variations can be made within the scope of the invention. Parts mentioned in these examples are by weight.

EXAMPLE I

To 100 active p.b.w. (parts by weight) of carboxylated styrene-butadiene latex (CSB latex) 0.5 active p.b.w. of the equimolar mixture of the diethanolamine salt of mono- and bis-(1,1-dihydroperfluorocyclohexylmethyl) phosphates (Compound A) was added.

This functional surface coating composition was coated on 50 pounds/ream Southern kraft. The actual laydown on the paper was 6 to 8 pounds/ream. Results of the TAPPI T507su-68 test for oil resistance follow:

| | Peanut oil holdout of creased specimens at 60° C., hours (avg.) |
|---|---|
| CSB latex (100 p.b.w.) | 1.4 |
| CSB latex (100 p.b.w.)/Compound A (0.5 p.b.w.) | 2.1 |

These results show the improved oil resistance of CSB latex coatings containing Compound A.

EXAMPLE II

To 100 active p.b.w. of CSB latex the following fluorochemicals were respectively added as indicated below:

0.1 and 1.0 p.b.w. Compound A.

Those compositions containing Compound A were applied at 6 to 8 lbs./ream to both the machine finished (MF) and machine glazed (MG) papers listed above, as well as to 40 lb. supercalendered (SC) paper.

Results of the TAPPI T507su-63 test are as follow:

| Paper | Coating | Flat peanut oil holdout at 600° C., hours avg. |
|---|---|---|
| SC | CSB latex (100 p.b.w.) | 4.5 |
| SC | CSB latex (100 p.b.w.)/Compound A (0.1 p.b.w.) | 5.1 |
| MF | CSB latex (100 p.b.w.) | 3.3 |
| MF | CSB latex (100 p.b.w.)/Compound A (0.1 p.b.w.) | 6.2 |
| MF | CSB latex (100 p.b.w.)/Compound A (1.0 p.b.w.) | 12.0 |
| MG | CSB latex | 2.5 |
| MG | CSB latex (100 p.b.w.)/Compound A (0.1 p.b.w.) | 6.8 |
| MG | CSB latex (100 p.b.w.)/Compound A (1.0 p.b.w.) | 16.0 |

These results demonstrate the improved oloephobicity of CSB latex coatings containing Compound A. The effect is apparent on a range of paper finishes (MF to SC).

EXAMPLE III

Functional surface coating compositions were prepared by blending a fluorine containing phosphate material, Compound A, with CSB latex.

The peanut oil holdout (creased) of the resulting functional surface coating compositions applied at 6 to 8 pounds per 3,000 square feet to 50 pound kraft paper and tested at 60° C. is shown in the following table:

| Coating composition (parts per weight) | | |
|---|---|---|
| CSB latex | Fluorine containing phosphate material | Maximum holdout time (hours) |
| 100 | 0.0 | 0.75 |
| 100 | 0.1 | 1.0 |
| 100 | 0.5 | 5.0 |
| 100 | 1.0 | 7.0 |

The turpentine holdout (flat) of the same functional surface coating compositions applied to the kraft paper at 23° C. is shown in the following table:

| Coating composition (parts per weight) | | |
|---|---|---|
| CSB latex | Flourine containing phosphate material | Maximum holdout time (seconds) |
| 100 | 0.0 | 99 |
| 100 | 0.1 | 173 |
| 100 | 0.5 | 635 |
| 100 | 1.0 | 860 |

Thus, with as little as 0.1 p.b.w. of the fluorine containing phosphate material the resistance of the functional surface coating composition to grease is substantially improved.

EXAMPLE IV

A functional surface coating composition was prepared by blending a fluorine containing phosphate material, Compound A, with CSB latex.

The peanut oil holdout (creased) of the resulting functional surface coating composition applied at 6 to 8 pounds per 3,000 square feet to 50 pound kraft paper and tested at 60° C. is shown in the following table:

| Coating composition (parts by weight) | | |
|---|---|---|
| CSB latex | Flurine containing phosphate material | Holdout time (hours) |
| 100 | 0.0 | 1.4 |
| 100 | 0.5 | 3.5 |

EXAMPLE V 70 lb. clay coated paperboard, commonly used in food packaging, was coated on board side with a typical grease resistant composition:

| | Coating weight lbs./ream |
|---|---|
| Ethylene-vinyl acetate copolymer | 2 |
| Polyvinylidene chloride | 2.5 |

The ethylene-vinyl acetate (Et-VAc) is applied as a primer in a single coat, while the polyvinylidene chloride (PVDC) is normally applied as a double coat over the primer, to insure a pin-hole free surface.

The coatings were subjected to a second peanut oil holdout test. The peanut oil penetrated the score line immediately.

Quite unexpectedly, the addition of 0.1% of Compound A to either the Et/VAc or PVDC materials resulted in a finished board which resisted the penetration of dyed peanut oil at the score line for more than 1 hour.

And again, quite unexpectedly, when 0.1% by weight of a mixture containing ammonium bis-(N-ethyl-2-perfluoroalkylsulfonamide ethyl)phosphates and ammonium mono-(N-ethyl-2-perfluoroalkylsulfonamide ethyl) phosphates, Compound B, was added to either the Et/VAc or PVDC materials, the resultant coatings not only withstood penetration of peanut oil on the flat board, but also on the score line for more than 1 hour.

EXAMPLE VI

Functional surface coating compositions 1 and 2 were prepared as follows:

| | Parts per weight | |
|---|---|---|
| Material | Composition 1 | Composition 2 |
| CSB latex | 4.5 | 4.5 |
| Hydroxyethylated starch | 13.5 | 13.5 |
| Compound A | 0.0 | 1.0 |
| Clay dispersion | 100.0 | 100.0 |

Compositions 1 and 2 were applied to raw book stock at a coating weight of 10 pounds per ream. When tested in accordance with the TAPPI RC-19 ink holdout test, the stock coated with composition 1 showed deep staining whereas the stock coated with composition 2 showed very light staining thereby proving the ability of Compound A to holdout oil-based ink.

EXAMPLE VII

The following coatings, applied to kraft paper at 6 to 8 pounds/ream, were subjected to the "coalescence" test. Compound C in the following coating is the diethanolamine salt of mono- and bis-(1H, 1H, 2H, 2H-perfluoroalkyl) phosphates, where the fluorine content is between 52.4% and 54.4% as determined on a solids basis.

| | Coalescence value |
|---|---|
| Vinylacetate copolymer | 31 |
| Vinylacetate copolymer/1% Compound C | 20 |

The lower rating indicates the solvent resistance of the coating is greater with 1% of the fluorine-containing phosphate material.

From the foregoing it will be seen that this invention is well adapted to obtain all of the ends and objects hereinabove set forth, together with other advantages which are obvious and which are inherent to the system.

As can be seen, the functional surface coating compositions of this invention provide paper coatings which are superior to the natural and synthetic polymers typically employed as converting chemicals. The functional surface coating compositions can be used as either on-machine or off-machine coatings.

Because of the inherent properties of the functional surface coating compositions of this invention, the coatings are useful not only in letterpress printing techniques but also in offset printing. The compositions are also utilizable in size press or machine operations coating.

Obviously, many modifications and variations of the invention as hereinbefore set forth can be made without departing from the spirit and scope thereof and therefor, only such limitations should be imposed as are indicated in the appended claims.

We claim:

1. A coated paper having on at least one surface, a continuous adherent dried coating comprising a functional surface coating composition comprising (1) 0.05 to 10 percent by weight of a fluorine-containing phosphate material and (2) 90 to 99.95 percent by weight of a non-fluorine containing material consisting of carboxylated styrene-butadiene, hydroxyethylated starch, polyvinylidene chloride, or vinyl acetate copolymer, wherein the fluorine-containing phosphate material has the structure:

$$(R_fL)_{3-y}Z$$

where $R_f$ is:

$R_2(CF_2)_a$—, where $R_2$ is F or H and $a$ is an integer between 1 and 20;

$(CF_3)_2CR_3(CF_2)_b$—, where $R_3$ is F or H and $b$ is 0 and $R_3$ is F when $b$ is an integer between 1 and 18; or $R_4(c\text{-}C_6F_{10})$—, where $R_4$ is F or $C_nF_{2n+1}$ and $n$ is an integer between 1 and 4 and where c- designates an alicyclic structure;

where L is:

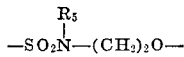

where $R_5$ is an alkyl group having 1 to 10 carbon atoms; or

—$(CH_2)_nO$—, where $n$ is the integer 1 or 2;

where $y$ is an integer of 1 or 2; and where Z is:

—$P(O)(OM)_x$, where $x$ is the integer 1 or 2; and M is a water solubilizing cation of the group consisting of alkali metal ammonium and substituted ammonium when $x$ is 1, and each M is independently selected from the group consisting of hydrogen, alkali metal, ammonium and substituted ammonium when $x$ is 2.

2. The paper of claim 1 wherein the fluorine-containing polymer is the diethanolamine salt of a mixture of mono- and bis-(1,1 - dihydroperfluorocyclohexylmethyl) phosphates.

3. The paper of claim 1 wherein the fluorine-containing polymer is a mixture of ammonium bis- and mono-(N-ethyl-2-perfluoroalkylsulfonamide ethyl) phosphates.

4. A process for treating cellulosic material, which process comprises: applying a functional surface coating composition to the cellulosic material and heating the treated material to a temperature from about 23° C. to about 205° C. for a period between 24 hours and 5 seconds, wherein the coating composition is prepared by blending in a substantially aqueous medium (1) 0.05 to 10 percent by weight of a fluorine-containing phosphate material and (2) 90 to 99.95 percent by weight of a non-fluorine containing material consisting of carboxylated styrene-butadiene, hydroxyethylated starch, polyvinylidene chloride, or vinyl acetate copolymer, wherein the fluorine-containing phosphate material has the structure:

$$(R_fL)_{3-y}Z$$

where $R_f$ is:

$R_2(CF_2)_a$—, where $R_2$ is F or H and $a$ is an integer between 1 and 20;

$(CF_3)_2CR_3(CF_2)_b$—, where $R_3$ is F or H and $b$ is 0 and $R_3$ is F when $b$ is an integer between 1 and 18; or $R_4(c\text{-}C_6F_{10})$—, where $R_4$ is F or $C_nF_{2n+1}$ and $n$ is an integer between 1 and 4 and where c- designates an alicyclic structure;

where L is:

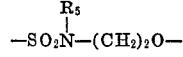

where $R_5$ is an alkyl group having 1 to 10 carbon atoms; or

—$(CH_2)_nO$—, where $n$ is the integer 1 or 2;

where $y$ is an integer of 1 or 2; and where Z is:

—$P(O)(OM)_x$, where $x$ is the integer 1 or 2; and M is a water solubilizing cation of the group consisting of alkali metal, ammonium and substituted ammonium when $x$ is 1 and each M is independently selected from the group consisting of hydrogen, alkali metal, ammonium and substituted ammonium when $x$ is 2.

5. The process of claim 4, wherein the functional surface coating composition is applied to the cellulosic material by roller coating.

6. The process of claim 4, wherein the functional surface coating composition is applied to the cellulosic material by a wire wound rod coating blade.

7. The process of claim 4, wherein the cellulosic material is paper.

8. The process of claim 4, wherein the cellulosic material is cardboard.

References Cited

UNITED STATES PATENTS

| | | | |
|---|---|---|---|
| 2,597,702 | 5/1952 | Benning | 260—924 X |
| 3,000,760 | 9/1961 | Greiller | 117—111 |
| 3,231,418 | 1/1966 | Maggleton | 117—111 |
| 3,083,224 | 3/1963 | Brace et al. | 117—154 X |
| 3,094,547 | 6/1963 | Heine | 117—154 X |
| 3,096,207 | 7/1963 | Cohen | 117—154 X |
| 3,188,340 | 6/1965 | Mackenzie | 117—154 X |
| 3,378,609 | 4/1968 | Fasick et al. | 117—155 X |
| 3,386,933 | 6/1968 | Genzabella | 117—155 X |
| 3,392,702 | 7/1968 | Warner | 117—111 X |
| 3,465,014 | 9/1969 | Pavlik | 117—121 X |

WILLIAM D. MARTIN, Primary Examiner

M. R. LUSIGNAN, Assistant Examiner

U.S. Cl. X.R.

117—111 H, 121, 154, 155 UA, 156